United States Patent [19]

Nishimura et al.

[11] 4,303,760

[45] Dec. 1, 1981

[54] ADHESIVE

[75] Inventors: Makoto Nishimura, Utsunomiya; Yoshio Omori, Kawachi; Yoshio Fujiwara, Utsunomiya, all of Japan

[73] Assignee: Sony Corporation, Tokyo, Japan

[21] Appl. No.: 173,073

[22] Filed: Jul. 28, 1980

Related U.S. Application Data

[62] Division of Ser. No. 57,126, Jul. 11, 1979, abandoned.

[30] Foreign Application Priority Data

Jul. 15, 1978 [JP] Japan .................................. 53-86506
Jul. 17, 1978 [JP] Japan .................................. 53-87014

[51] Int. Cl.³ ...................... C08F 220/54; C08L 63/00
[52] U.S. Cl. .................................... 525/117; 428/355; 526/263
[58] Field of Search .......................................... 525/117

[56] References Cited

U.S. PATENT DOCUMENTS 3,383,373  5/1968  Waples, Jr. ......................... 260/86.7
3,480,601  11/1969  Ashby et al. ....................... 260/86.1
3,509,086  4/1970  Rohrbacher ........................ 525/117
3,671,256  6/1972  Minsk et al. ......................... 96/111
3,719,646  3/1973  Stecklen et al. ................. 260/80.72

Primary Examiner—Harry Wong, Jr.
Attorney, Agent, or Firm—Hill, Van Santen, Steadman, Chiara & Simpson

[57] ABSTRACT

An adhesive particularly suitable for use with polyvinyl fluoride sheets consisting predominantly of a copolymer of two vinyl compounds, compound (1) containing an aziridinyl group and the other vinyl compound (2) being capable of copolymerizing with the first named compound. The vinyl compound (1) has the following formula:

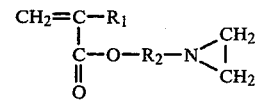

where $R_1$ is H or $CH_3$, and $R_2$ is an alkylene group containing from 1 to 8 carbon atoms. The adhesive may further contain an epoxy resin.

4 Claims, No Drawings

ADHESIVE

CROSS REFERENCE TO RELATED APPLICATION

This is a division of application Ser. No. 057,126, filed July 11, 1979, now abandoned.

This application contains subject matter in common with an application of Nishimura et al U.S. Ser. No. 872,108, filed on Jan. 25, 1978, and issued as U.S. Pat. No. 4,158,725 on June 19, 1979.

BACKGROUND OF THE INVENTION

1. Field of the Invention

This invention relates to an adhesive which is prepared by copolymerizing two vinyl compounds, compound (1) containing an aziridinyl group and the other usually consisting of an acrylic acid ester or a methacrylic acid ester of an alcohol having from 1 to 8 carbon atoms per molecule.

2. Description of the Prior Art

In recent times, there has been significant use of polyvinyl fluoride sheets in laminated structures which, for example, are used as wall covering materials because they have superior weather resistance, wear resistance, and resistance to solvents. The polyvinyl fluoride sheets are marketed under the trademark "Tedlar" by E. I. du Pont de Nemours & Co. In this type of polyvinyl fluoride polymer, one hydrogen atom is substituted by one fluorine atom in each ethylene unit of the polyethylene.

An adhesive to be suitable for use in attaching "Tedlar" film or sheet to the surface of a metal such as aluminum or to a polyvinyl chloride article must have various requirements, for example, high adhesiveness, high cohesiveness, a stability to hydrolysis and the like. If the adhesive does not meet these requirements, the film or sheet is apt to be peeled away from the surface of the metal and the polyvinyl fluoride could not be effectively used in the laminate.

Adhesives for "Tedlar" films or sheets are disclosed in Japanese Patent Publication No. 18530/1963 (corresponding to U.S. Pat. No. 3,133,854), No. 26763/1963 and No. 11918/1967 by E. I. du Pont de Nemours & Co. These adhesives are manufactured in a process in which one or more types of acrylates or methacrylates are copolymerized with a small amount of a monomer having an epoxy group, and gaseous ammonia or a primary monoamine are reacted with the resulting copolymer. The adhesive thus obtained consists of an acrylate or methacrylate polymer having an amino group or an imino group on the side chain.

The "Tedlar" film to be attached to the substrate may be surface treated in a special manner as described in Japanese Patent Publications Nos. 18530/1963 and 11918/1967. We have investigated the adhesive properties of the surface treated "Tedlar" produced according to these disclosures. A methacrylic polymer having a carboxyl group, a hydroxyl group, an amide group, or a carbonyl group as the functional groups on the side chain exhibited little adhesiveness toward "Tedlar". A methacrylic polymer having glycidyl groups on the side chain exhibited some adhesiveness to the "Tedlar". However, this adhesiveness was not particularly satisfactory.

The methacrylic polymer of the Japanese patents has the following functional group:

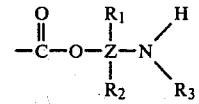

where Z is a hydrocarbon group, and $R_1$, $R_2$ and $R_3$ are alkyl groups, respectively. Such a polymer is synthesized by the reaction of amines with a vinyl polymer including glycidyl methacrylate and the like, or by reaction of imines with a vinyl polymer of a carboxylic acid. However, these known adhesives have the disadvantage that they require a large number of steps in the synthesis and also that the imines are strongly toxic and have carcinogenic properties.

SUMMARY OF THE INVENTION

The present invention provides an adhesive composition which exhibits satisfactory adhesive properties toward "Tedlar" and which can be produced in a simple and economical way. In accordance with the present invention, we provide an adhesive consisting predominantly of a copolymer of a vinyl compound (1) containing an aziridinyl group copolymerized with a second vinyl compound (2) usually consisting of an acrylic type ester. The vinyl compound (1) has the following formula:

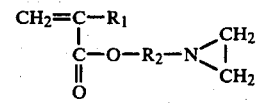

where $R_1$ is H or $CH_3$, and $R_2$ is an alkylene group containing from 1 to 8 carbon atoms.

DESCRIPTION OF THE PREFERRED EMBODIMENTS

The copolymer produced according to the present invention exhibits strong adhesiveness to films of "Tedlar" particularly to surface treated and activated "Tedlar" surfaces because of the presence of the aziridinyl group. The copolymer accordingly has extremely good properties as an adhesive.

The aziridinyl containing vinyl compound (1) can be the commercially available compound 2-(1-aziridinyl) ethylmethacrylate (abbreviated as "AZM") having the following formula:

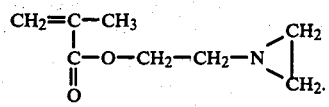

The "AZM" is manufactured by Sogo Yakko Kabushiki Gaisha and is sold by them. This compound can be used directly in the manufacture of the adhesive of the present invention without the necessity of separate syntheses. Thus, the adhesive of the present invention can be manufactured quite simply in using such a compound by merely copolymerizing the same with another vinyl compound. As a result, the manufacture of the adhesive requires only one reaction process and therefore is very simple in comparison with conventional means of providing such adhesives. The aziridinyl containing vinyl compound is also desirable from the standpoint of safety because it is less toxic than previously used imine compounds.

In accordance with the present invention, the vinyl compound (1) having the aziridinyl group is copolymerized with another vinyl compound (2) to produce the adhesive. It is preferable that the content of the vinyl compound (1) in the copolymer be from 0.1 to 20% by weight, with the balance being the vinyl compound (2). This content or copolymerization ratio corresponds to an amount of nitrogen atoms of 0.009 to 1.8% by weight when calculated as the content of nitrogen atoms of the aziridinyl groups in the copolymer. If the content of aziridinyl groups or nitrogen atoms is below the minimums specified above, the adhesive force of the adhesive is considerably lessened. If the content is more than specified in the above-mentioned ranges, the adhesive is apt to form a gel.

The aziridinyl containing vinyl compound (1) can be aziridinyl acrylate or aziridinyl methacrylate, in addition to the aforementioned AZM. Examples of such aziridinyl acrylates or methacrylates are 2-(1-aziridinyl) alkyl-acrylate or methacrylate such as 2-(1-aziridinyl) methylacrylate, 2-(1-aziridinyl) ethylacrylate, 2-(1-aziridinyl) propylacrylate, 2-(1-aziridinyl) butylacrylate, 2-(1-aziridinyl) hexylacrylate, 2-(1-aziridinyl) octylacrylate, 2-(1-aziridinyl) methylmethacrylate, 2-(1-aziridinyl) ethylmethacrylate, 2-(1-aziridinyl) propylmethacrylate, 2-(1-aziridinyl) butylmethacrylate, 2-(1-aziridinyl) hexylmethacrylate, 2-(1-aziridinyl) octylmethacrylate, and the like.

The vinyl compound (2) copolymerizable with the aziridinyl vinyl compound can be composed mainly of acrylic acid esters or methacrylic acid esters of an alcohol containing from 1 to 8 carbon atoms per molecule. Examples of acrylic acid esters are methyl acrylate, ethyl acrylate, n-propyl acrylate, isopropyl acrylate, n-butyl acrylate, tertiary butyl acrylate, amyl acrylate, n-hexyl acrylate, cyclohexyl acrylate, 2-ethyl hexyl acrylate and the like. Examples of methacrylic acid esters are methyl methacrylate, ethyl methacrylate, n-propyl methacrylate, n-butyl methacrylate, n-amyl methacrylate, 3-methyl-pentyl methacrylate, n-hexyl methacrylate, 2-methyl hexyl methacrylate, 2-ethyl hexyl methacrylate, n-heptyl methacrylate, n-octyl methacrylate, and the like.

Portions of the acrylic ester or methacrylic acid ester used as vinyl compound (2) may be replaced by a vinyl compound of another kind when adhesive is to be used as a pressure sensitive or hot-melt type adhesive. In this case, less than 20 parts by weight, or preferably less than 10 parts by weight per 100 parts by weight of acrylic ester or methacrylic acid ester are replaced by the other vinyl compound. Examples of other vinyl compounds for partial substitution in this manner are the acrylic acid esters or methacrylic acid esters of an alcohol having from 9 to 18 carbon atoms. In addition, we can also use vinyl compounds such as vinyl chloride, vinyl propionate, acrylonitrile and vinyl acetate, and the like.

When the copolymer of the present invention is used as a pressure sensitive type adhesive, it is preferable that the glass transition temperature (Tg) of the copolymer is in the range from $-85°$ to $0°$ C. For use as a hot-melt type adhesive, the glass transition temperature (Tg) of the copolymer should be in the range of about $40°$ to $80°$ C. It is preferable that the number average molecular weight ($\overline{M}n$) of the copolymer be in the range of 10,000 to 80,000, and that the weight average molecular weight ($\overline{M}w$) be from 30,000 to 400,000 when measured, for example, by gel permeation chromatography.

The adhesive or the adhesive compositions of the present invention may further contain an epoxy resin in an amount of 0.1 to 100 parts by weight per 100 parts by weight of the copolymer. The presence of the epoxy resin results in an improved cohesiveness of the adhesive and therefore results in remarkably high strength and waterproof properties. Consequently, adhesive compositions according to the present invention which contain epoxy resins can be made to endure severe conditions for use in internal and external designs. If the amount of epoxy resin is less than about 0.1 part by weight, the cohesiveness is not sufficiently improved. The adhesiveness is deteriorated when the epoxy resin content is over 100 parts by weight per 100 parts of the copolymer.

The epoxy resin used in accordance with the present invention should have an epoxy value or equivalent of about 100 to 3,000 and may be of the bisphenol type, the novolak type or the like. Examples of such epoxy resins are "Epikote 828" marketed by Shell Chemical Corp. (bisphenol type; epoxy equivalent of 84 to 194), "Epikote 1004" by the same company (bisphenol type; epoxy equivalent of 900 to 1,000), "Epikote 152" marketed by the same company (novolak type; epoxy equivalent of 172 to 179), and so on.

It is also preferable that a curing agent be included to harden the epoxy resin in an amount of 0.1 to 50 parts by weight for 100 parts by weight of the copolymer. The addition of the curing agent causes a hardening of the adhesive composition to obtain a sufficient strength. When the amount of the curing agent is less than 0.1 part by weight, the effect of hardening is insufficient. When the amount of curing agent is in excess of 50 parts by weight, the adhesive composition is hardened more than necessary, and may cause a deterioration of the adhesive force. Curing agents which can be used for the present invention include hexahydrophthalic anhydride (HHPA), methylnadic anhydride (MNA), "Epikure U", an addition product of diglycidyl ether of bisphenol A and diethylene triamine having an epoxy equivalent of 180 to 195, or the like.

Specific embodiments of the present invention will be described in a succeeding portion of this specification, but the present invention is not limited to these embodiments.

EXAMPLES

To produce the adhesive, a monomer, a polymerization initiator and a solvent were first introduced into a reaction vessel in predetermined amounts. The resulting mixture was reacted with a reflux temperature of $85°$ C. for 7 hours at atmospheric pressure under an atmosphere of nitrogen gas while being efficiently stirred. A diluting solution was added to the reaction product to form a solution of the vinyl polymer adhesive.

The method of measuring the adhesion strength was performed as follows. Each surface of several polyvinyl fluoride films ("Tedlar") was coated with the adhesive. The coated "Tedlar" films were dried at a temperature of $70°$ C. for 2 minutes to form an adhesive layer having a thickness of about 4 microns. Then, a polyvinyl chloride film of 0.2 mm thickness containing about 25 to 35% plasticizer and sold under the trade name "M205" by Sambow Resin Industry Corp. was laminated on the "Tedlar" film with the adhesive layer. The polyvinyl chloride film was pressed to the "Tedlar" film with a nip roll operated at a temperature of 140° C. leaving a portion unadhered over a length of about 50 mm from the margin of the film. The laminated materials were left for 7 days at room temperature. Where the sample was immediately applied to a test machine, this was referred to as a "normal test" and in the case where a sample was applied to the test machine after being immersed in boiling water, the test was called a "boiled water test". The tensile strength of the sample was measured such that the unadhered part was attached to a chuck of a tension tester and the film was peeled off in a T-shaped manner. The width of the sample was 20 mm and the tension speed was 50 mm/min. When the film broke down, the breaking strength was recorded. The break down of the film was represented by the letter "F".

In a peeling test, a sample was formed by coating an aluminum plate with the adhesive so that the thickness of the adhesive was 6 to 8 microns in a dry condition.

separated from the aluminum plate by cutting the interface between the two with a razor, and then parallel splits 5 mm apart from each other were formed in the separated portion of the film in the rectangular direction. Then, the separated portion of the film was lifted with a pair of tweezers and subsequently pulled in the perpendicular direction. To prepare the aluminum plate for use herein, a plate of 2 mm thickness was immersed for 5 minutes at a temperature of 70° C. into a treating liquid comprising a mixture of 5 g chromic acid anhydride, 500 g sulfuric acid, and 1,500 g distilled water. It was washed by water after being taken out of the treating liquid and was dried at a temperature of 60° C. for 30 minutes. In the evaluation of the results of the normal test, a circle indicates a condition in which there was no abnormal appearance of the laminated material such as separation, shrinkage, or blistering of the film and a peeling-off of the film was not observed in the peeling test.

| | | Adhesion Strength Between The Polyvinyl Fluoride Film And The Polyvinyl Chloride Film | | | | | | |
|---|---|---|---|---|---|---|---|---|
| | Specific Examples | | 1 | 2 | 3 | 4 | 5 | 6 |
| Compounding | Liquid for polymerization* | MMA | 99.8 | 99 | 97 | 95 | 90 | 60 |
| | | BMA | — | — | — | — | — | 35 |
| | | AZM | 0.2 | 1 | 3 | 5 | 10 | 5 |
| | | AIBN | 0.4 | 0.4 | 0.4 | 0.4 | 0.4 | 0.4 |
| | | Toluene | 70 | 70 | 100 | 70 | 70 | 70 |
| | | Isopropanol | 30 | 30 | — | 30 | 30 | 30 |
| | Diluting Liquid | Toluene | 90 | 90 | 133 | 90 | 90 | 90 |
| | | Isopropanol | 43 | 43 | — | 43 | 43 | 43 |
| | Viscosity of vinyl polymer solution (cps) | | 320 | 320 | 840 | 300 | 300 | 120 |
| Adhesion Strength (Kg/2 cm) | Normal Test | | 500 F | 620 F | 550 F | 580 F | 600 F | 740 F |
| | Boiled water test for 8 hours | | 20 | 60 | 80 | 80 | 80 | 100 |

*MMA : methyl methacrylate
BMA : butyl methacrylate
AZM : 2-(1-aziridinyl) ethylmethacrylate
AIBN : 2,2'-azobisisobutyronitrile

| | | Adhesion Strength Between The Polyvinyl Fluoride Film And The Aluminum Plate | | | | |
|---|---|---|---|---|---|---|
| | Specific Examples | 7 | 8 | 9 | 10 | 11 |
| Compounding | vinyl polymer* MMA | — | 37 | 60 | 95 | 35 |
| | BMA | 95 | 60 | 35 | — | 60 |
| | AZM | 5 | 3 | 5 | 5 | 5 |
| | Viscosity of vinyl polymer solution (cps) | 70 | 90 | 120 | 300 | 90 |
| | Heating condition (°C. × minute) | 200 × 1 | 200 × 1 | 200 × 1 | 240 × 1 | 200 × 1 |
| | Aging condition | 25 × 7 | 25 × 7 | 25 × 7 | 25 × 7 | 25 × 7 |
| Peeling test | Normal test | ○ | ○ | ○ | ○ | ○ |

*Polymerization condition for vinyl polymer: 70 parts toluene, 30 parts isopropanol and 0.4 part AIBN were mixed with the above tabled compounds and the resulting mixture was reacted at a temperature of 85° C. for 7 hours in nitrogen gas. The polymerization product was diluted by addition of a diluting liquid of 90 parts toluene and 40 parts isopropanol to form a polymer solution.

The aluminum plate was then dried until it reached a predetermined temperature. After being taken out of the drying furnace, the plate was immediately laminated with a "Tedlar" film by means of a nip roll. The laminated product thus obtained was aged under predetermined conditions. Where the laminated product was immediately subjected to the test, this was called a "normal test". A good result on this normal test is represented by a circle in the following tables. The sample was subjected to an appearance test as well as a peeling test. In the peeling test, the "Tedlar" film was partially As apparent from the above results, the "Tedlar" film with the adhesive according to the present invention exhibits a good adhesiveness for the polyvinyl chloride film and also for the aluminum plate, and has a superior waterproof property.

A series of compositions was prepared in which an epoxy resin was added with a curing agent to the adhesive solution obtained as described in the preceding example. The adhesive strength and the like were determined in the same manner as in the foregoing example. The symbol "X" in the following tables indicates that an abnormal appearance and a peeling-off of the film were observed.

| | | | Comparative Examples | | Specific Examples | | |
|---|---|---|---|---|---|---|---|
| | Examples | | 1*2 | 2*3 | 12 | 13 | 14 |
| Compounding | Liquid for polymerization | MMA | — | — | 97 | 95 | 60 |
| | | BMA | — | — | — | — | 35 |
| | | AZM | — | — | 3 | 5 | 5 |
| | | AIBN | — | — | 0.4 | 0.4 | 0.4 |
| | | Toluene | — | — | 100 | 70 | 70 |
| | | Isopropanol | — | — | — | 30 | 30 |
| | Diluting Liquid | Toluene | — | — | 133 | 90 | 90 |
| | | Isopropanol | — | — | — | 43 | 43 |
| | Viscosity of vinyl polymer solution (cps) | | — | — | 840 | 300 | 120 |
| | | Epikote 828 | — | — | 4 | 6 | 6 |
| | | HHPA *1 | — | — | 3 | 5 | 5 |
| Adhesion Strength (Kg/2 cm) | Normal test | | 550 | 560 | 600 | 600 | 700 |
| | | | F | F | F | F | F |
| | Boiled water test for 8 hours | | 80 | 80 | 550 | 520 | 650 |
| | | | | | F | F | F |

Adhesive Strength Between the Polyvinyl Fluoride Film And The Polyvinyl Chloride Film

*1 HHPA : hexahydrophthalic anhydride
*2 An adhesive of the comparative example 1 was produced by the method of U.S. SER. No. 872,108 filed on January 25, 1978. That is, the adhesive was produced by the steps of copolymerizing 87 parts methyl methacrylate and 10 parts ethyl acrylate with 3 parts glycidyl methacrylate, and treating 100 parts resulting copolymer with 7.9 parts 28% aqueous ammonia (NH4OH) to cause amination of the epoxy groups of the copolymer.
*3 An adhesive of the comparative example 2 was #6880 (adhesive for internal design, manufactured by E. I. duPont de Nemours & Co.).

Adhesion Strength Between The Polyvinyl Fluoride Film And The Aluminum Plate

| Specific Examples | | | 15 | 16 | 17 | 18 | 19 | 20 | 21 | 22 | 23 | 24 | 25 |
|---|---|---|---|---|---|---|---|---|---|---|---|---|---|
| Compounding | Vinyl polymer *1 | MMA | 40 | 97 | 39 | 40 | 40 | 35 | 35 | 30 | 97 | 95 | 60 |
| | | BMA | 57 | — | 60 | 57 | 57 | 60 | 60 | 60 | — | — | 35 |
| | | AZM | 3 | 3 | 1 | 3 | 3 | 5 | 5 | 10 | 3 | 5 | 5 |
| | Viscosity of vinyl polymer solution (cps) | | 80 | 300 | 100 | 80 | 80 | 90 | 90 | 100 | 300 | 300 | 120 |
| | Epikote 828 | | — | — | 6 | 4 | 12 | 6 | 6 | 30 | 4 | 6 | 6 |
| | HHPA | | 3 | 3 | 5 | 3 | 8 | — | — | — | 3 | 5 | 5 |
| | MNA *2 | | — | — | — | — | — | 6 | — | — | — | — | — |
| Heating condition (°C. × minute) | | | 200 × 1 | 240 × 1 | 120 × 1 | 200 × 1 | 120 × 1 | 120 × 1 | 200 × 1 | 200 × 1 | 240 × 1 | 240 × 1 | 200 × 1 |
| Aging condition (°C. × day) | | | 25 × 7 | 25 × 7 | 60 × 7 | 25 × 7 | 60 × 7 | 25 × 7 | 60 × 7 | 60 × 7 | 60 × 7 | 60 × 7 | 60 × 7 |
| Peeling test | Normal test | | O | O | O | O | O | O | O | O | O | O | O |
| | Boiled water test for 170 hours | | — | — | O | O | O | O | O | O | O | O | O |

*1 Polymerization condition was the same as that concerning the specific examples 7 to 11 already described.
*2 MNA: methylnadic anhydride

| | | | Comparative Examples | | Specific Examples | | | | | | |
|---|---|---|---|---|---|---|---|---|---|---|---|
| Examples | | | 3*2 | 4*3 | 26 | 27 | 28 | 29 | 30 | 31 | 32 |
| Compounding | Vinyl polymer*1 | MMA | — | — | 35 | 35 | 35 | 35 | 35 | 35 | 35 |
| | | BMA | — | — | 60 | 60 | 60 | 60 | 60 | 60 | 60 |
| | | AZM | — | — | 5 | 5 | 5 | 5 | 5 | 5 | 5 |
| | Viscosity of vinyl polymer solution (cps) | | — | — | 90 | 90 | 90 | 90 | 90 | 90 | 90 |
| | Epikote 828 | | — | 100 | 6 | 12 | 30 | 60 | 30 | — | — |
| | Epikote 1004 | | — | — | — | — | — | — | — | 15 | — |
| | Epikote 152 | | — | — | — | — | — | — | — | — | 10 |
| | HHPA | | — | 80 | 5 | 10 | 25 | 50 | — | — | — |
| | Epikure U | | — | — | — | — | — | — | 9 | 1 | 3 |
| Heating condition (°C. × minute) | | | 200 × 1 | 120 × 1 | 200 × 1 | 120 × 1 | 120 × 1 | 120 × 1 | 120 × 1 | 120 × 1 | 120 × 1 |
| Aging condition | | | 25 × 7 | 60 × 7 | 25 × 7 | 60 × 7 | 60 × 7 | 60 × 7 | 60 × 7 | 60 × 7 | 60 × 7 |

| Examples | | Comparative Examples 3*2 | Comparative Examples 4*3 | Specific Examples 26 | 27 | 28 | 29 | 30 | 31 | 32 |
|---|---|---|---|---|---|---|---|---|---|---|
| (°C. × day) | | | | | | | | | | |
| Peeling test | Normal test | ○ | × | ○ | ○ | ○ | ○ | ○ | ○ | ○ |
| | Boiled water test for 170 hours | ○ | – | ○ | ○ | ○ | ○ | ○ | ○ | ○ |

*[1] Vinyl polymer was the same as that of the specific example 20.
*[2] An adhesive of the comparative example 3 consisted of a mixture of #6870 and #68065 (#6870: #68065 = 100:10). The adhesive was to be used for metal manufactured by E.I. du Pont de Nemours & Co.
*[3] An adhesive composition of the comparative example 4 further contained 0.5 part 2,4,6-tri(dimethylaminomethyl) phenol as a curing catalyst.

As evident from the above data, the "Tedlar" films with the improved adhesives of the present invention exhibit good adhesiveness for polyvinyl chloride film as well as for aluminum, and have superior waterproof properties. When the vinyl polymer is cured with the addition of the epoxy resin, the strength and the waterproof property of the adhesive composition are further improved. Superior results can also be obtained even if the curing agent is not used in the adhesive composition.

It will be evident that various modifications can be made to the described embodiments without departing from the scope of the present invention.

We claim as our invention:

1. An adhesive comprising:
(A) a copolymer of (1) a vinyl compound containing an aziridinyl group and (2) another vinyl compound copolymerizable therewith, said vinyl compound (1) having the formula:

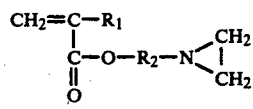

wherein $R_1$ is H or $CH_3$, and $R_2$ is an alkylene group containing 1 to 8 carbon atoms, said vinyl compound (2) being an acrylic acid ester or a methacrylic acid ester, said copolymer having a number-average molecular weight of from 10,000 to 80,000 and a weight average molecular weight of 30,000 to 400,000, and containing nitrogen atoms derived from the aziridinyl group in the range from 0.009 to 1.8% by weight of said copolymer,
(B) an epoxy resin of the bisphenol or novolak type having an epoxy value of 100 to 3000, said epoxy resin being present in the range from 0.1 to 100 parts by weight per 100 weight parts of said copolymer.

2. An adhesive according to claim 1, wherein said other vinyl compound is acrylic acid ester or methacrylic acid ester of an alcohol containing from 1 to 8 carbon atoms.

3. An adhesive according to claim 1 wherein less than 20 weight percent of said vinyl compound (2) is replaced by a further vinyl compound which is an acrylic acid ester or a methacrylic acid ester of an alcohol having from 9 to 18 carbon atoms.

4. An adhesive according to claim 1, wherein said adhesive further contains a curing agent for the epoxy resin in an amount from 0.1 to 50 parts by weight per 100 parts by weight of said copolymer.

* * * * *